United States Patent
Iwanaga

[11] 3,948,339
[45] Apr. 6, 1976

[54] TRANSMISSION LOCKING DEVICE

[75] Inventor: Kazuyoshi Iwanaga, Yokosuka, Japan

[73] Assignee: Nissan Motor Co., Ltd., Yokohama, Japan

[22] Filed: Sept. 19, 1974

[21] Appl. No.: 507,614

[30] Foreign Application Priority Data
Sept. 20, 1973 Japan.................. 48-109342[U]

[52] U.S. Cl.............. 180/82 C; 180/103 R; 251/33; 180/101
[51] Int. Cl.²........................................ B60R 21/08
[58] Field of Search...... 180/82 C, 82 R, 82 A, 111, 180/112, 103, 101; 251/30, 33, 43

[56] References Cited
UNITED STATES PATENTS

| | | | |
|---|---|---|---|
| 2,923,175 | 2/1960 | Perkins | 180/82 A X |
| 2,990,850 | 7/1961 | Cook | 251/43 X |
| 3,438,455 | 4/1969 | Redmond | 180/82 C |
| 3,859,625 | 1/1975 | Eggert, Jr. | 180/82 C X |

FOREIGN PATENTS OR APPLICATIONS
846,767  8/1960  United Kingdom.................. 251/43

*Primary Examiner*—M. H. Wood, Jr.
*Assistant Examiner*—John P. Silverstrim

[57] ABSTRACT

A positioning plate holding a transmission of a motor vehicle through a manual gear selector lever in position has a sector with a notch in the sector arc. A locking plunger with a projection is engaged by the notch when the transmission is in free gear. The engine may be started but the transmission remains locked in the free gear until the driver fastens his seat belt, by which the locking plunger is retracted from the notch and the transmission may be shifted into drive gears.

4 Claims, 1 Drawing Figure

U.S. Patent April 6, 1976 3,948,339
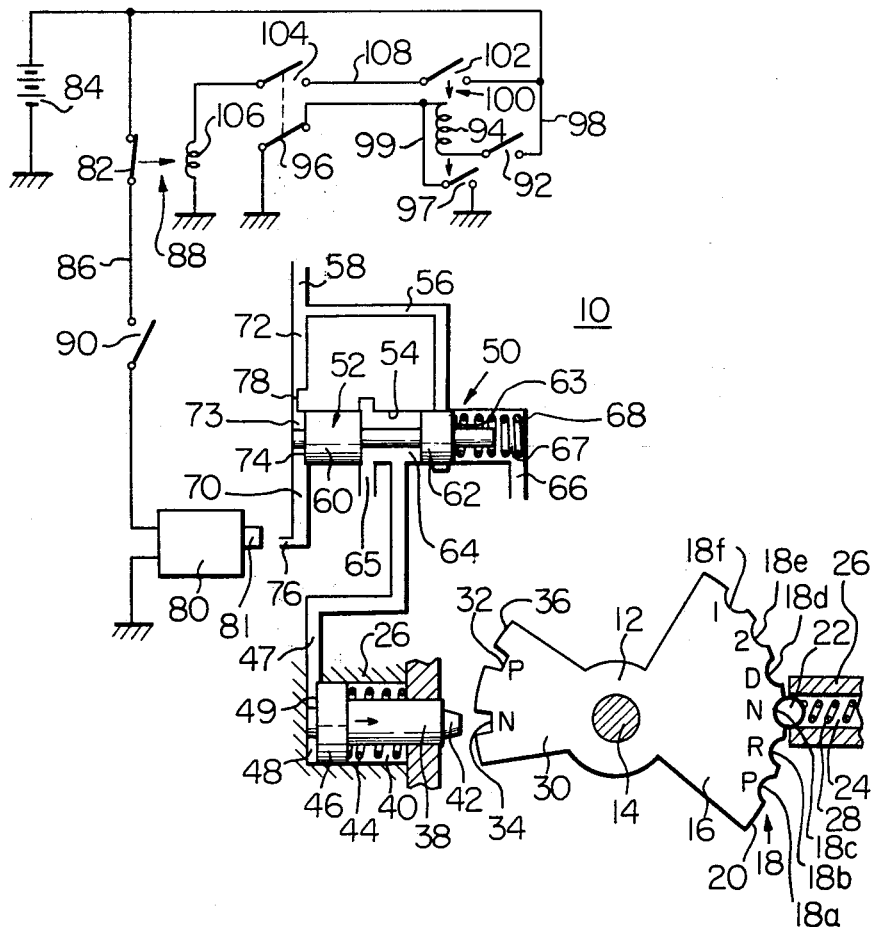

TRANSMISSION LOCKING DEVICE

The present invention relates generally to a locking device for preventing a transmission of a motor vehicle from being shifted to a driving gear and particularly to a device for compelling a driver of the vehicle to carry out precautionary procedures to protect himself such as fastening his seat belt by locking the transmission in neutral or free gear position if he fails to carry out the precautionary procedures.

Motor vehicles are at present required by law in many countries to be equipped with seat belts. The purpose of this is to prevent the driver or occupant of the vehicle from being thrown forward from his seat in the event of a collision of the vehicle to protect the driver and occupant from injury in a collision with structural parts of the vehicle which is called the "second collision". However, many occupants fail to fasten the seat belts because of the troublesome steps or procedures required for fastening the seat belts and discomfortable oppression of bodies of the occupants after fastening them. Thus, in fact most of the seat belts are merely provided for use but most of the vehicles are started and driven with the seat belts being unfastened by the occupants.

As an attempt to force vehicle occupants to fasten seat belts, a device has been proposed which, when equipped in a motor vehicle, generates a warning signal and simultaneously inhibits the engine from starting if the vehicle driver fails to fasten his seat belt. Thus, the device has an inconvenience in that manipulation and inspection of the engine and the vehicle for starting the engine is impossible unless the driver fastens his seat belt, with the result that the seat belt restrains movements required of the driver for performing manipulation and inspection of the engine and the vehicle.

It is, therefore, an object of the invention to provide a device which compels a vehicle driver to fasten his seat belt for driving without requiring him to fasten the seat belt only for starting the engine.

It is a further object of the invention to provide a locking device which prevents an automatic transmission of a motor vehicle from being shifted to a driving gear when a driver of the vehicle fails to fasten his seat belt but which allows the engine to start without requiring the driver to fasten the seat belt.

These and other objects and advantages of the invention will become more apparent from the following detailed description taken in conjunction with the accompanying drawing showing a schematic cross sectional view of a preferred embodiment of a locking device according to the invention. The invention will be described as applied to an automatic transmission.

Referring now to the drawing, a locking device 10 according to the invention is shown which is constructed to cooperate with and include a positioning plate 12 forming a part of an automatic power transmission (not shown) of a motor vehicle. The positioning plate 12 is fixedly mounted on a rotatable shaft 14 and rotatable with it in accordance with shifting movement of a manually operated gear selector lever (not shown). Rotation of the positioning plate 12 causes a manual selector valve (not shown) of a hydraulic control system of the transmission to be axially moved to its various positions. The positioning plate 12 has a first sector 16 which is formed with a series of recesses or indents 18 in an arc 20 thereof. The indents 18 number, by way of example, six indents 18a to 18f which correspond to the parking position P, reverse position R, neutral position N, automatic driving range position D, lock up 2nd gear position 2 and lock up 1st gear position 1 of the selector lever, as illustrated by P, R, N, D, 2 and 1 in the drawing. The indents 18a to 18f each have an internal rounded or cylindrical wall surface and are engaged by a detent 22 such as a ball or plunger which is loosely fitted in an aperture 24 formed in a casing 26 of the transmission and which is urged by a compression spring 28 into engagement with the indents 18a to 18f. When the selector lever and the transmission are in the positions P, R, N, D, 2 and 1, the positioning plate 12 is in the corresponding angular positions P, R, N, D, 2 and 1 in which the corresponding indents 18a to 18f engage the detent 22 to hold the selector lever in position in such a way that the selector lever is not moved from the selected position by a force smaller than a shifting force of the driver of the vehicle.

In the illustrated embodiment of the locking device 10 of the invention, the positioning plate 12 has a second sector 30 which is formed with first and second recesses or indents 32 and 34 in the arc 36 thereof opposite to the arc 20 with respect of the center of the shaft 14, as shown in the drawing. The indents 32 and 34 both have a cross section of a suitable shape such as a trapezoid and are exactly 180° to indents 18a and 18c, respectively. The indent 32 may be omitted if desired.

The locking device 10 further comprises a locking plunger or rod 38 cooperating with the second sector 30 of the positioning plate 12. The plunger 38 is slidably disposed in an aperture 40 formed in the transmission casing 26 and has at one end a detent or projection 42 having a suitable contour such as a trapezoid as shown. The detent 42 is positioned at a location opposite to the detent 22 with respect of the center of the shaft 14 and is engageable with the first or second indent 32 or 34 in the arc 36 of second segment 30 when the positioning plate 12 is in a non-drive position such as the parking or neutral position P or N, respectively. The plunger 38 is axially movable between a retracted or unlocking position shown in the drawing in which the detent 42 is disengaged from the indents 32 and 34 to allow shifting of the positioning plate 12 and accordingly the selector lever and a protruded or locking position in which the detent 42 engages the indent 32 or 34 to lock the selector lever through the positioning plate 12 in the parking or neutral position P or N, respectively. A compression spring 44 is disposed in the aperture 40 to bias the plunger 38 into the retracted position. The plunger 38 is formed with a land 46 thereon which is slidably fitted in the aperture 40. A conduit 47 communicates with a fluid chamber 48 defined between one end 49 of the land 46 and an end wall of the aperture 40 for feed of hydraulic fluid under pressure into the fluid chamber 48. The plunger 38 is moved, when hydraulic fluid under pressure is fed into the fluid chamber 48, from the retracted position to the protruded position by the force of the fluid pressure acting on the end 49 of the land 46 overcoming the force of the spring 44. A flow control valve 50 is provided to control supply of the hydraulic fluid under pressure to the conduit 47. The control valve 50 includes a valve spool 52 which is slidably fitted in a bore 54 formed in the transmission casing 26 or a valve body. The bore 54 communicates with the conduit 47 and with a conduit 56 which is connected with a conduit 58 communicating with a source (not shown) of hydraulic fluid under pressure such as a line pressure conduit of the hydraulic control system of the transmission. The valve spool 52 has spaced first and second lands 60 and 62 with an identical diameter, and an annular groove 64 formed between the lands 60 and 62. The annular groove 64 provides communication between the conduits 47 and 56 so that hydraulic fluid under pressure is supplied into the fluid chamber 48 when the valve spool 52 is in the rightmost or operative position in the drawing. Exhaust ports 65 and 66 communicating with a drain line (not shown) open into the bore 54. The exhaust port 66 vents a space 67 between the valve spool 52 and the right end in the drawing of the bore 54 to the drain line. A compression spring 68 is disposed in the bore 54 to bias the valve spool 52 into the leftmost or normal position shown in the drawing in which the land 62 blocks communication between the conduit 47 and 56 and the conduit 47 communicates with the exhaust port 65. An exhaust conduit 70 and a conduit 72 which is connected with the conduits 56 and 58 communicate with a fluid chamber or space 73 which is defined between one end 74 of the land 60 and an end wall of the bore 54. The exhaust conduit 70 communicates with the drain lines, although not shown. A solenoid 80 is provided with a plunger 81 on its core controlling drain from the exhaust conduit 70. The coil (not shown) of the solenoid 80 is energized causing the plunger 81 to close the conduit 70 when the driver of the vehicle fails to fasten his seat belt (not shown) provided in the vehicle to encircle the driver for his safety. The coil of the solenoid 80 is de-energized so that the plunger 81 opens the conduit 70 when the driver fastens his seat belt. When the solenoid 80 actuates the plunger 81 to open the conduit 70, the valve spool 52 is held in or moved to the leftmost position by the force of the spring 68. When the solenoid 80 actuates the plunger 81 to close the conduit 70, the valve spool 52 is moved to the rightmost position by the force of hydraulic fluid under pressure in the fluid chamber 73 acting on the end 74 of the land 60 by overcoming the force of the spring 68. The conduits 70 and 72 may have formed therein orifices or restrictions 76 and 78, respectively. The cross-sectional area of the orifice 76 is greater than that of the orifice 78. The cross-sectional areas of the orifices 76 and 78 are determined in such a manner that the pressure of the hydraulic fluid in the fluid chamber 73 is reduced to the extent, for instance even to zero, that the valve spool 52 is moved to the leftmost position by the force of the spring 68 when the conduit 70 is opened by the plunger 81 with the valve spool 52 being in the rightmost position.

The solenoid coil of the solenoid 80 is connected with a first electric control circuit 86 including a normally closed relay switch 82 and an electric power source 84 such as a battery which are connected in series to each other for passing electric current through the solenoid coil to energize it. The relay switch 82 forms a part of a relay 88 and is opened when a relay coil 106 forming a part of the relay 88 is energized. The control circuit 86 preferably has a switch 90 such as an ignition switch for the engine of the vehicle or a switch which is closed when the engine runs and which is opened when the engine is not running. The source 84 is connected with a second electric control circuit 98 including a normally open first switch 92, a relay coil 94 and a normally closed switch 96 which are connected in series with each other. A normally open relay switch 97 is connected with the relay coil 94 to form a third electric control circuit 99. The relay coil 94 and the relay switch 97 form a part of a relay 100 and the relay coil 94 is energized when the first switch 92 is closed. The relay switch 96 is closed when the coil 94 is energized. The first switch 92 is closed when the driver sits on his seat (not shown) of the vehicle. The source 84 is also connected with a fourth electric control circuit 108 including a normally open relay switch 102, a normally open switch 104 and the relay coil 106 which are connected in series with each other. The relay switch 102 forms a part of the relay 100 and is closed when the relay coil 94 is energized. The switch 104 is closed when the driver fastens his seat belt. The switch 96 is opened when the switch 104 is closed. The relay 100 is of a self-holding type so that the switches 97 and 102 remain closed when the switch 110 is opened.

The operation of the locking device 10 thus constructed is as follows.

When the driver sits on the seat and starts the engine but fails to fasten his seat belt with the selector lever in the neutral or parking position N or P, the switch 92 is closed so that the relay coil 94 is energized to close the switches 97 and 102. The switch 104 remain open to cause de-energization of the relay coil 106. De-energization of the relay coil 106 keeps the switch 82 closed to cause energization of the coil of the solenoid 80. The solenoid 80, by energization of its coil, actuates the plunger 81 to close the conduit 70. Closing of the conduit 70 results in an increase in the pressure of the hydraulic fluid in the fluid chamber 73. Thus, the valve spool 52 is moved by the force of the fluid pressure acting on the end 74 overcoming the force of the spring 68 to the rightmost position to provide communication between the conduits 56 and 47 so that the fluid under pressure is supplied into the fluid chamber 48. The locking plunger 38 is moved to the operative position by the force of the fluid under pressure acting on the end 49 of the land 46 overcoming the force of the spring 44. As a result, the detent 42 of the locking plunger 38 engages the indent 32 or 34 of the second sector 30 to lock the positioning plate 12 and therefore the selector lever in the parking or neutral position P or N, respectively to inhibit shifting of the transmission to a drive gear. In this condition, when the driver fastens his seat belt, the switch 104 is closed to cause energization of the relay coil 106 and opening of the switch 96. The switches 97 and 102 remain closed. The switch 82 is opened by energization of the relay coil 106 to cause de-energization of the coil of the solenoid 80. De-energization of the coil of the solenoid 80 deactuates the plunger 81 to open the conduit 70. As a result, the pressure of the hydraulic fluid in the fluid chamber 73 is reduced to cause the valve spool 52 to be moved to the leftmost position by the force of the spring 68. Thus, the land 62 blocks communication between the conduits 56 and 47 and the conduit 47 communicates with the exhaust port 65 to cause the locking plunger 38 to retract to the rest position by the force of the spring 44 so that the detent 42 is disengaged from the indent 32 or 34. As a result, the positioning plate 12 allows the selector lever and hence the transmission to be shifted from the parking or neutral position to a desired drive gear by the driver to allow the vehicle to start moving.

If the driver unfastens his seat belt during running of the vehicle, there is the possibility that the locking plunger 38 of the device 10 is moved to the operative position and will lock the positioning plate 12 and therefore also the selector lever in the neutral or parking position N or P. Such a possibility or action is dangerous and should be avoided. To this end, the first electric control circuit 86 preferably has a switch which is closed when the vehicle is at a standstill and which is opened to render the locking device 10 inoperative when the vehicle is running.

It should be appreciated that the problem of inhibiting a motor vehicle from starting to move even though the engine is running when the driver of the vehicle fails to carry out precautionary procedures or steps for his safety such as fastening his seat belt, is solved by a locking device according to the invention. The construction and operation of the locking device are simplified and reliable respectively, by a positioning plate for holding a manually operated gear selector lever of an automatic transmission in a selected position which is provided with a sector formed with first and second recesses in the arc of the sector and a locking plunger which has formed thereon a projection engageable with the first and second recesses of the positioning plate when the same is in parking and neutral positions, respectively and which is movable between the retracted position in which the projection is disengaged from the recesses to allow shifting of the positioning plate and accordingly the selector lever and an operative position in which the projection engages the first and second recesses to lock the positioning plate and accordingly the selector lever in the parking and neutral positions, respectively.

It should be also appreciated that the locking device according to the invention has an advantage in that manipulation and inspection of the engine and the vehicle after starting the engine is possible without fastening the seat belt.

Although the switch 104 has been described such that it is closed when the driver fastens his seat belt, the switch 104 may be constructed to be closed only when all of occupants of the vehicle fasten their seat belts.

What is claimed is:

1. A locking device for preventing an automatic transmission of a motor vehicle from being shifted to a driving position when the driver of the vehicle fails to carry out a precautionary safety procedure, said device comprising: a transmission position selector movable between said driving position and a neutral position; first means movable from a retracted position to a protruded position to lock said selector in said neutral position; second means for moving said first means from said retracted position to said protruded position; and third means for actuating said second means when said driver fails to carry out said precautionary procedure; said transmission position selector including an arcuate plate with a recess formed therein; said first means including a locking plunger engageable in said recess, in said protruded position, and means for biasing said plunger to said retracted position; said second means including a first fluid chamber, a source of hydraulic fluid for communicating with said first fluid chamber to force said plunger to said protruded position, a flow control valve movable from a first position, blocking communication between said source and said first fluid chamber, to a second position, providing said communication, means for biasing said flow control valve to said first position, a second fluid chamber communicating with said source, and an exhaust conduit communicating with said second fluid chamber; said third means including a member movable between a position closing said exhaust conduit and a position opening said exhaust conduit, and a solenoid actuating said member to said closing position when said driver fails to take said precautionary procedure, whereby, when said exhaust conduit is closed, fluid pressure build up in said second chamber, from said source, will move said valve to said second position, in which position fluid pressure build up in said first chamber will move said plunger to said protruded position.

2. A locking device as claimed in claim 1, in which the third means further includes a first electric control circuit including a normally closed relay switch connected with said solenoid, a second electric control circuit connected with said first control circuit and including a normally open first switch which is closed when said driver sits on his seat, a first relay coil which is energized when said first switch is closed and a normally closed second switch, a third electric control circuit connected with said first relay coil and including a normally open relay switch which is closed when said relay coil is energized, a fourth electric control circuit connected with said first control circuit and including a normally open relay switch cooperating with said relay coil and closed when said relay coil is energized, a normally open second switch which is closed when said driver fastens his seat belt provided in said vehicle and a second relay coil cooperating with said normally closed relay switch, said normally closed relay switch being opened when said second relay coil is energized, said normally closed second switch being opened when said normally open second switch is closed, said normally open relay switches being a self-holding type.

3. A locking device for locking a transmission of a motor vehicle in a non-drive position, comprising a positioning plate for holding a manually operated gear selector lever and a transmission of a motor vehicle in a selected position and having a sector which is formed with a recess in the arc thereof and having a non-drive position corresponding to that of said selector lever and said transmission, locking means for locking said positioning plate and comprising a locking plunger which is formed thereon with a projection and a land slidably fitted in a bore and having a locking position in which said projection engages said recess of said sector in said non-drive position to lock said positioning plate and a non-locking position in which said projection is disengaged from said recess of said sector to allow said positioning plate to move, a first fluid chamber which is communicable with a pressurized hydraulic fluid source and into which hydraulic fluid pressure is fed from said source to act on said land to move said locking plunger into said locking position when said first fluid chamber communicates with said source, and first biasing means urging said locking plunger to said non-locking position, valve means for controlling fluid communication between said source and said first fluid chamber and comprising a valve spool slidably fitted in a bore and formed with an annular groove, a second fluid chamber which communicates with said source and with an exhaust conduit and into which hydraulic fluid pressure is fed from said source to act on said valve spool, said valve spool having a normal position in which it blocks fluid communication between said source and said first fluid chamber and an operative position in which said annular groove provides fluid communication between said source and said first fluid chamber, and second biasing means for urging said valve spool to said normal position, and a solenoid actuable member operable to close said exhaust conduit to increase hydraulic fluid pressure in said second fluid chamber acting on said valve spool so that said valve spool is moved into said operative position by said increased fluid pressure against the force of said second biasing means when a driver of said vehicle fails to carry a precautionary procedure and open said exhaust conduit to reduce hydraulic fluid pressure in said second fluid chamber acting on said valve spool so that said valve spool is returned into said normal position by the force of said second biasing means when said driver carries out said precautionary procedure.

4. A locking device as claimed in claim 3, in which a first orifice is formed in said exhaust conduit and a second orifice is formed in a conduit communicating said second fluid chamber with said pressurized hydraulic fluid source, said first orifice being greater in cross sectional area than said second orifice.

* * * * *